No. 658,274. Patented Sept. 18, 1900.
J. MORIN.
GAGE FOR CROSSCUT SAWS.
(Application filed Sept. 18, 1899.)
(No Model.)

WITNESSES:
Frank Ellsworth Knowles
Joseph M. Glasgow

Joseph Morin
INVENTOR

UNITED STATES PATENT OFFICE.

JOSEPH MORIN, OF SEATTLE, WASHINGTON.

GAGE FOR CROSSCUT-SAWS.

SPECIFICATION forming part of Letters Patent No. 658,274, dated September 18, 1900.

Application filed September 18, 1899. Serial No. 730,967. (No model.)

*To all whom it may concern:*

Be it known that I, JOSEPH MORIN, a citizen of the United States, and a resident of Seattle, in the county of King and State of Washington, have invented certain new and useful Improvements in Gages for Crosscut-Saws, of which the following is a specification.

My invention relates to improvements in gages to enable the operator to more easily and accurately gage and test the raker-teeth of crosscut-saws and joint the cutting-teeth of the same and is an improvement on my Patent No. 540,329, dated June 4, 1895; and the objects of my improvement are, first, to provide a device in connection with saw-gages for gaging and testing the raker or chisel teeth of crosscut-saws in swaging the same; second, to provide a device in connection with a saw-gage for holding a chilled metal plate having a slot large enough to admit a raker-tooth solid and immovable with reference to the body of the gage and at a certain distance below the points of the cutting-teeth, so that the points of each raker-tooth may be made exactly the same length; third, to provide a device for holding a file solid and immovable with its face at an accurate right angle with the blade of the saw for jointing the cutting-teeth; fourth, to provide a smooth frictionless surface in a perfect plane to rest on the cutting-teeth when gaging raker-teeth for swaging, and also to have a transverse section of this plane accurately at right angles with the saw-blade when swaging. I attain these objects by the tool described in the accompanying drawings, in which—

Figure 1:
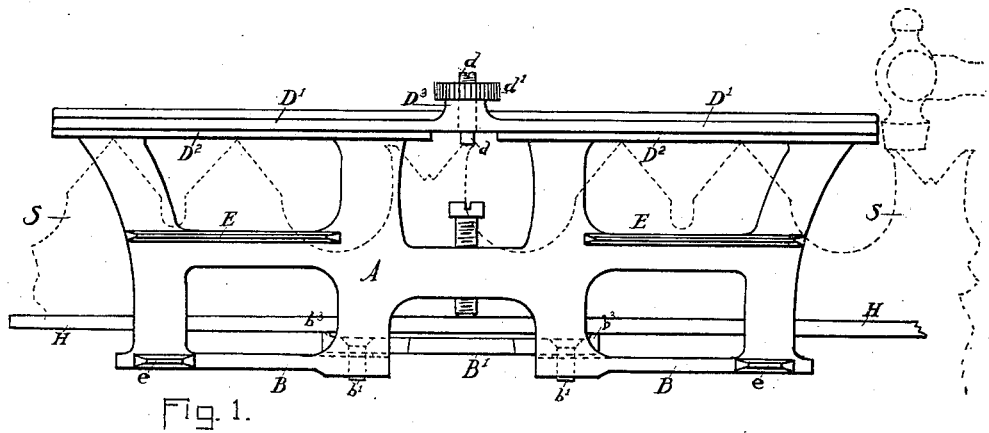
Figures 3, 4:
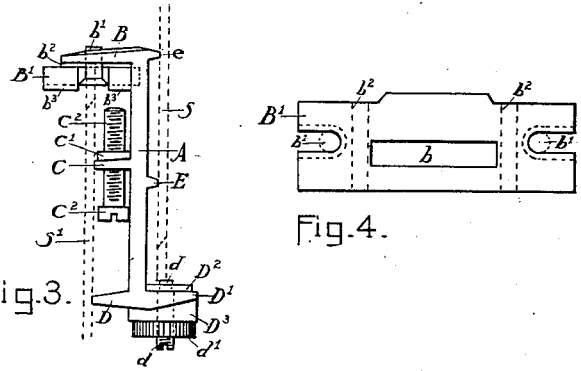
Figure 2:
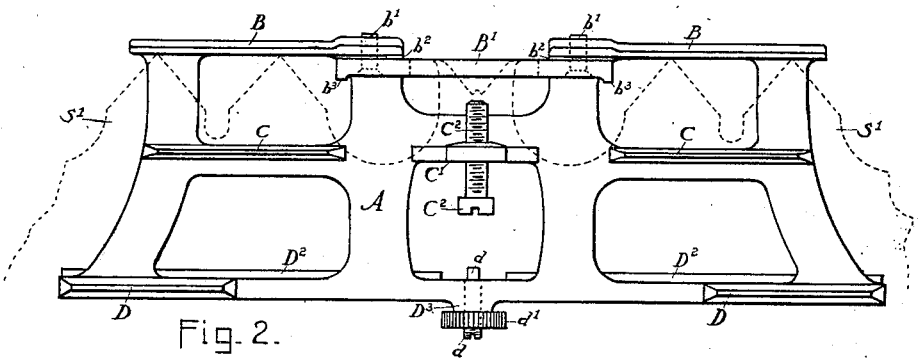

Figure 1 (A) represents a side elevation shown in position on saw S S for testing raker-teeth in swaging; Fig. 2, (A,) the opposite side elevation, reversed, in position on S' S' for jointing or filing points of raker-teeth; Fig. 3, an end view showing on one side ribs traveling on side of saw-blade S' in jointing raker-teeth and showing on opposite side, reversed, ribs traveling on side of saw-blade S in swaging; and Fig. 4 is a detail plan view of the chilled plate used when filing raker-teeth.

Similar letters refer to similar parts throughout the several views.

The main part of my gage is made of a light cast frame, with openings through the body to reduce the weight and for other purposes, as shown in Fig. 1, letter A. On one side (shown in Fig. 1) at the top is a flange or traveling cap $D'$ $D'$, faced with glass $D^2$ $D^2$, cemented to metal flange, an end view of the same being shown in Fig. 3, thus providing a true plane surface or straight edge on inner side of glass perfectly smooth, enabling the gage to slide backward and forward over points of cutting-teeth without friction and without injuring points of cutting-teeth and making it easily noticeable when raker-tooth interrupts gage-screw $d\ d$. This gage-screw $d\ d$, Fig. 1, is threaded and passes through the thickened part of flange $D'$, also threaded, (marked $D^3$,) midway between the ends of $D'$ $D'$ and extending below the inner surface of the glass face or straight edge $D^2$ $D^2$, a short piece of the glass midway between the ends being removed to give room for this screw. The side of screw next to plate is on a line with the outer edges of parallel ribs, and end of screw is about flat and at right angles therewith. In swaging the raker-teeth by turning this screw the operator can fix the lower end at any desired distance below the straight edge or under surface of the glass. Threaded onto the upper end of screw $d\ d$ is a knurled thumb-nut $d'$, which is screwed down tight against top of flange $D^3$ to prevent screw $d\ d$ from being accidentally moved. Midway from the top to the bottom and on the bottom edge of main plate, on side shown in Fig. 1, are two slight parallel ribs $E\ E\ e\ e$, much narrower than flange $D'$, also shown in Fig. 3, the outer edges of which are ground to a perfect right angle with the surface of the glass straight edge which prevent the cutting-teeth after having been set from engaging the side of the main plate and travel on the side of the saw as the gage is moved along in swaging. The middle portion of each of these ribs is removed to make the gage lighter. On opposite side of main plate when gage is reversed, as shown in Fig. 2, and on the top edge is a flange B B, interrupted midway between ends by an opening under which is fastened a chilled plate B', as described below. On the lower edge and halfway between it and upper flange are parallel ribs C C and D D, much narrower than flange B B and extending part way along the plate to strengthen it, the outer edges making a perfect right angle with the under surface of flange B B and traveling on side of saw when jointing cutting-teeth or filing all of them to same length. Attached to the under side of flange B, covering the opening mentioned, as shown in detail in Fig. 2 and end view in Fig. 3, is the chilled plate B', (shown in Fig. 4,) held solidly and firmly at its ends to flange B by two screws $b'$ $b'$, passing through slots made to fit heads of screws $b'$ $b'$. The top of this chilled plate is on a true parallel plane with the inner side of flange B B one-fiftieth of an inch lower, (more or less, as desired by operator,) the chilled plate at its ends being separated from flange by two pieces of sheet metal $b^2$ $b^2$, also shown in end view, Fig. 3. The sheet metal is used in order to drop the top of chilled plate B' slightly below the inner surface of flange B B on a true parallel line and so that when fastened with the screws $b'$ $b'$ to flange B it is perfectly solid, so that it cannot move out of this parallel plane or one end become higher than the other and deceive the operator. Through this chilled plate is a slot $b$ for the insertion of the raker-teeth, (shown by dotted lines, Fig. 2,) which are jointed or filed down till the file rests on the chilled plate, and this plate, fixed as above, makes the points of each raker-tooth exactly the same length, the points of raker-tooth exactly the same distance below the points of the cutting-tooth, and each chisel or top edge of raker a right angle with saw-blade. This plate is made of chilled metal to prevent the file cutting it when used on raker-tooth. At the corners on the under side of chilled plate B', as shown in Fig. 2, are four little lugs or rises $b^3$ $b^3$, also shown in Fig. 1. Middle rib C', Fig. 2, has a thickened portion in its middle. (Shown in Fig. 3.) Through this thickened part of the rib a threaded screw is run, so that when a file is placed against the four lugs by turning this screw the file is clamped solid against the four lugs, the width between the inside ones and ones farthest from main plate being sufficient to make a firm clamp. The plane passing through the points of these lugs being at a perfect right angle with the outer edges of parallel ribs C C D D when file is fastened against these lugs and cutting-teeth jointed it makes a perfect jointer. File is shown in this position in Fig. 1, H H.

Having thus described my invention, what I claim, and desire to secure by Letters Patent, is—

1. A gage for crosscut-saws consisting of a plate or frame having a lateral flange on one edge, said flange being formed with an opening or cut-away portion intermediate of its ends and an aperture at each side of and close to said opening, a plate formed with a slot for the raking-teeth of the saw, said plate being of a length greater than the opening or cut-away portion of the flange whereby its ends will be overlapped by the ends of the flange bordering on said opening, and having slots in such overlapped ends adapted to register with the apertures in the flange, and fastening devices passing through said end slots into the apertures, as set forth.

2. In a gage for crosscut-saws, the combination with the body of the gage having a flange on one edge and longitudinal ribs on its side, and a clamping-screw for a file mounted on the side of the said body, of a plate adapted for attachment to the under side of said flange and formed, on that side which is adjacent to the clamping-screw, with lugs whose points are in a plane at right angles to the side edges of said ribs, as set forth.

3. In a gage for crosscut-saws, the combination with the body of the gage formed with an edge flange and side ribs, of a screw working in said flange between the ends thereof and adapted to extend below the surface of the same, that side of the screw next to the gage-body being on a line with the outer edges of said ribs, and a locking-nut on said screw, substantially as set forth.

4. In a crosscut-saw gage the combination with the body of the gage consisting of a flat plate having a flange or traveling cap on one edge, two longitudinal ribs, one at the opposite edge and the other in the middle, of a glass plate or straight edge cemented to the under surface of the flange forming a perfect plane, said plane being at right angles with a plane passing through the outer edges of the parallel ribs, and a gage-screw working in said flange, substantially as shown and described.

5. In a crosscut-saw gage, the combination with the body of the gage provided with a traveling cap or flange on one edge, said flange being formed with an opening intermediate of its ends, of a glass plate cemented to the under surface of said flange, said plate having a cut-out portion registering with the opening in the flange, and a gage-screw working in said flange, as and for the purpose set forth.

6. In a gage for crosscut-saws, the combination with the body of the gage formed with a flange on one edge having an opening intermediate its ends and an aperture at each side of said opening, a chilled plate having a slot for the raking-teeth of the saw and end slots adapted to register with the apertures in the flange, screws fitted in said slots and working in said apertures, and a metallic strip interposed between the flange and each end of the plate close to the screws as and for the purpose set forth.

JOSEPH MORIN.

Witnesses:
 FRANK ELLSWORTH KNOWLES,
 JOSEPH M. GLASGOW.